US012292854B1

(12) United States Patent
Ali et al.

(10) Patent No.: US 12,292,854 B1
(45) Date of Patent: May 6, 2025

(54) INTELLIGENT CO-RELATION OF FILE SYSTEM AND APPLICATIONS EVENTS TO DERIVE ADAPTIVE FILE SYSTEM POLICIES

(71) Applicant: International Business Machines Corporation, Armonk, NY (US)

(72) Inventors: Asmahan Ali, Poughkeepsie, NY (US); Pidad Gasfar D'Souza, Bangalore (IN); Amey Gokhale, Pune (IN); Diane Gyesoon Chung, Poughkeepsie, NY (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 18/582,469

(22) Filed: Feb. 20, 2024

(51) Int. Cl.
*G06F 16/11* (2019.01)
*G06F 16/16* (2019.01)
*G06F 16/182* (2019.01)

(52) U.S. Cl.
CPC .......... *G06F 16/122* (2019.01); *G06F 16/164* (2019.01); *G06F 16/1824* (2019.01)

(58) Field of Classification Search
CPC ... G06F 16/122; G06F 16/164; G06F 16/1824
See application file for complete search history.

(56) References Cited

U.S. PATENT DOCUMENTS

| | | | |
|---|---|---|---|
| 8,019,965 B2 | 9/2011 | Agombar et al. | |
| 8,539,186 B2 | 9/2013 | Sechrest et al. | |
| 8,862,845 B2 | 10/2014 | Lary et al. | |
| 9,213,721 B1* | 12/2015 | Faibish | G06F 16/185 |
| 9,424,263 B1* | 8/2016 | Aston | G06F 3/0643 |
| 11,025,747 B1* | 6/2021 | Keogh | H04L 61/4511 |
| 11,093,625 B2 | 8/2021 | Vijayvargiya | |

(Continued)

FOREIGN PATENT DOCUMENTS

WO   2000049537 A2   8/2000

OTHER PUBLICATIONS

Shorfuzzaman et al., "Adaptive Replica Placement in Hierarchical Data Grids," High Performance Computing Symposium, Journal of Physics: Conference Series 256, 2010, 20 pages.

(Continued)

*Primary Examiner* — Apu M Mofiz
*Assistant Examiner* — Farhad Agharahimi
(74) *Attorney, Agent, or Firm* — Zilka-Kotab, P.C.

(57) ABSTRACT

A computer-implemented method (CIM), according to one embodiment, includes causing a policy engine to monitor metrics. The metrics include use of a first storage pool of a data storage system, and the first storage pool has relatively faster performance than a second storage pool. The method includes causing the policy engine to dynamically predict users that are likely to use the system. The predicted users are dynamically categorized according to a category of user that does not create any files of at least a predetermined large size, a category of user that creates at least some but less than a predetermined number of files of at least the predetermined large size, and a category of user that creates at least the predetermined number of files of at least the predetermined large size. The method includes dynamically assigning files of the predicted users to storage pools, based on the dynamic categorizations.

20 Claims, 6 Drawing Sheets

(56) References Cited

U.S. PATENT DOCUMENTS

| | | |
|---|---|---|
| 11,182,080 B2 | 11/2021 | Zhuang et al. |
| 2009/0307329 A1 | 12/2009 | Silberstein et al. |
| 2022/0261167 A1 | 8/2022 | Resch et al. |

OTHER PUBLICATIONS

Aws, "Creating file system policies," Amazon Web Services, Inc., 2024, 4 pages, retrieved from https://docs.aws.amazon.com/efs/latest/ug/create-file-system-policy.html.

Ellard et al., "Attribute-Based Prediction of File Properties," Jan. 2004, 14 pages, retrieved from https://www.debugmind.com/wp-content/uploads/2014/09/Attribute-Based-File-Prediction.pdf.

\* cited by examiner

INTELLIGENT CO-RELATION OF FILE SYSTEM AND APPLICATIONS EVENTS TO DERIVE ADAPTIVE FILE SYSTEM POLICIES

BACKGROUND

The present invention relates to file systems, and more specifically, this invention relates to assignment of files to storage pools.

Advanced file systems provide a means to automate file management using policies and rules. Properly managing files allows efficient use and balance of premium and inexpensive storage resources by applying a policy rule. Relatively high-performance clustered file system software sometimes include a parallel file system that supports policies to govern user data movement and placement. In some use cases, file system software may support file placement policies, and file management policies during the lifecycle of a file.

SUMMARY

A computer-implemented method (CIM), according to one embodiment, includes causing a policy engine to monitor predetermined metrics. The metrics include use of a first storage pool of a data storage system, and the first storage pool has relatively faster performance than a second storage pool of the data storage system. The method further includes causing the policy engine to dynamically predict, based on the monitoring of the predetermined metrics, users that are likely to use the data storage system. The predicted users are dynamically categorized according to a plurality of predetermined categories including: a first category of user that does not create any files of at least a predetermined large size, a second category of user that creates at least some but less than a predetermined number of files of at least the predetermined large size, and a third category of user that creates at least the predetermined number of files of at least the predetermined large size. The method further includes dynamically assigning files of the predicted users to predetermined storage pools of the data storage system, including the first storage pool, based on the dynamic categorizations.

A computer program product (CPP), according to another embodiment, includes a set of one or more computer-readable storage media, and program instructions, collectively stored in the set of one or more storage media, for causing a processor set to perform the foregoing method.

A computer system (CS), according to another embodiment, includes a processor set, a set of one or more computer-readable storage media; and program instructions, collectively stored in the set of one or more storage media, for causing the processor set to perform the foregoing method.

Other aspects and embodiments of the present invention will become apparent from the following detailed description, which, when taken in conjunction with the drawings, illustrate by way of example the principles of the invention.

DETAILED DESCRIPTION

Figure 1:
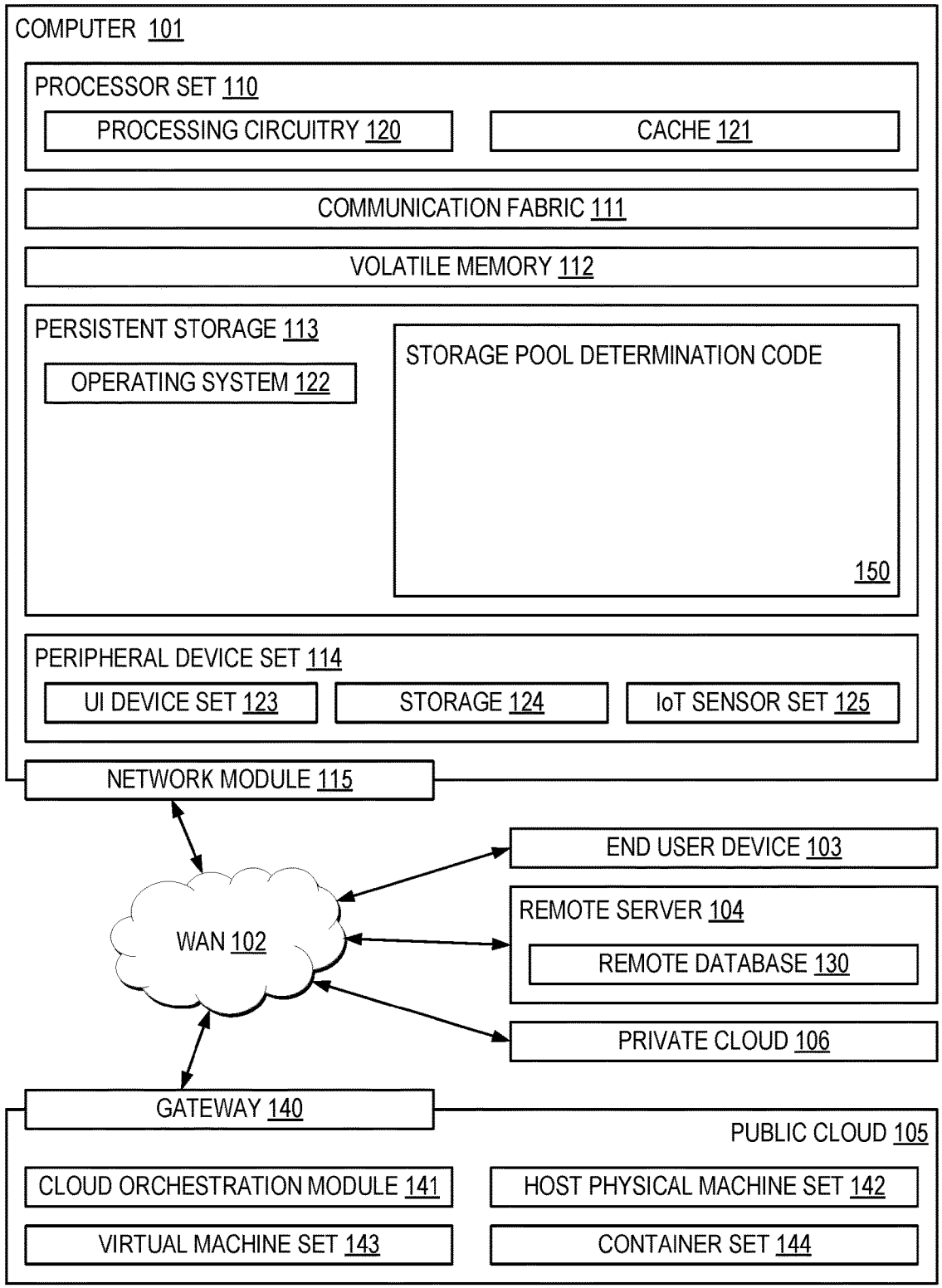
FIG. 1 is a diagram of a computing environment, in accordance with one embodiment of the present invention.

The following description is made for the purpose of illustrating the general principles of the present invention and is not meant to limit the inventive concepts claimed herein. Further, particular features described herein can be used in combination with other described features in each of the various possible combinations and permutations.

Unless otherwise specifically defined herein, all terms are to be given their broadest possible interpretation including meanings implied from the specification as well as meanings understood by those skilled in the art and/or as defined in dictionaries, treatises, etc.

It must also be noted that, as used in the specification and the appended claims, the singular forms "a," "an" and "the" include plural referents unless otherwise specified. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The following description discloses several preferred embodiments of systems, methods and computer program products for dynamic assignment of files to storage pools.

In one general embodiment, a CIM includes causing a policy engine to monitor predetermined metrics. The metrics include use of a first storage pool of a data storage system, and the first storage pool has relatively faster performance than a second storage pool of the data storage system. The method further includes causing the policy engine to dynamically predict, based on the monitoring of the predetermined metrics, users that are likely to use the data storage system. The predicted users are dynamically categorized according to a plurality of predetermined categories including: a first category of user that does not create any files of at least a predetermined large size, a second category of user that creates at least some but less than a predetermined number of files of at least the predetermined large size, and a third category of user that creates at least the predetermined number of files of at least the predetermined large size. The method further includes dynamically assigning files of the predicted users to predetermined storage pools of the data storage system, including the first storage pool, based on the dynamic categorizations.

In another general embodiment, a CPP includes a set of one or more computer-readable storage media, and program instructions, collectively stored in the set of one or more storage media, for causing a processor set to perform the foregoing method.

In another general embodiment, a CS includes a processor set, a set of one or more computer-readable storage media; and program instructions, collectively stored in the set of one or more storage media, for causing the processor set to perform the foregoing method.

Various aspects of the present disclosure are described by narrative text, flowcharts, block diagrams of computer systems and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation or garbage collection, but this does not render the storage device as transitory because the data is not transitory while it is stored.

Computing environment 100 contains an example of an environment for the execution of at least some of the computer code involved in performing the inventive methods, such as storage pool determination code of block 150 for dynamic assignment of files to storage pools. In addition to block 150, computing environment 100 includes, for example, computer 101, wide area network (WAN) 102, end user device (EUD) 103, remote server 104, public cloud 105, and private cloud 106. In this embodiment, computer 101 includes processor set 110 (including processing circuitry 120 and cache 121), communication fabric 111, volatile memory 112, persistent storage 113 (including operating system 122 and block 150, as identified above), peripheral device set 114 (including user interface (UI) device set 123, storage 124, and Internet of Things (IoT) sensor set 125), and network module 115. Remote server 104 includes remote database 130. Public cloud 105 includes gateway 140, cloud orchestration module 141, host physical machine set 142, virtual machine set 143, and container set 144.

COMPUTER 101 may take the form of a desktop computer, laptop computer, tablet computer, smart phone, smart watch or other wearable computer, mainframe computer, quantum computer or any other form of computer or mobile device now known or to be developed in the future that is capable of running a program, accessing a network or querying a database, such as remote database 130. As is well understood in the art of computer technology, and depending upon the technology, performance of a computer-implemented method may be distributed among multiple computers and/or between multiple locations. On the other hand, in this presentation of computing environment 100, detailed discussion is focused on a single computer, specifically computer 101, to keep the presentation as simple as possible. Computer 101 may be located in a cloud, even though it is not shown in a cloud in FIG. 1. On the other hand, computer 101 is not required to be in a cloud except to any extent as may be affirmatively indicated.

PROCESSOR SET 110 includes one, or more, computer processors of any type now known or to be developed in the future. Processing circuitry 120 may be distributed over multiple packages, for example, multiple, coordinated integrated circuit chips. Processing circuitry 120 may implement multiple processor threads and/or multiple processor cores. Cache 121 is memory that is located in the processor chip package(s) and is typically used for data or code that should be available for rapid access by the threads or cores running on processor set 110. Cache memories are typically organized into multiple levels depending upon relative proximity to the processing circuitry. Alternatively, some, or all, of the cache for the processor set may be located "off chip." In some computing environments, processor set 110 may be designed for working with qubits and performing quantum computing.

Computer readable program instructions are typically loaded onto computer 101 to cause a series of operational steps to be performed by processor set 110 of computer 101 and thereby effect a computer-implemented method, such that the instructions thus executed will instantiate the methods specified in flowcharts and/or narrative descriptions of computer-implemented methods included in this document (collectively referred to as "the inventive methods"). These computer readable program instructions are stored in various types of computer readable storage media, such as cache 121 and the other storage media discussed below. The program instructions, and associated data, are accessed by processor set 110 to control and direct performance of the inventive methods. In computing environment 100, at least some of the instructions for performing the inventive methods may be stored in block 150 in persistent storage 113.

COMMUNICATION FABRIC 111 is the signal conduction path that allows the various components of computer 101 to communicate with each other. Typically, this fabric is made of switches and electrically conductive paths, such as the switches and electrically conductive paths that make up buses, bridges, physical input/output ports and the like. Other types of signal communication paths may be used, such as fiber optic communication paths and/or wireless communication paths.

VOLATILE MEMORY 112 is any type of volatile memory now known or to be developed in the future. Examples include dynamic type random access memory (RAM) or static type RAM. Typically, volatile memory 112 is characterized by random access, but this is not required unless affirmatively indicated. In computer 101, the volatile memory 112 is located in a single package and is internal to computer 101, but, alternatively or additionally, the volatile memory may be distributed over multiple packages and/or located externally with respect to computer 101.

PERSISTENT STORAGE 113 is any form of non-volatile storage for computers that is now known or to be developed in the future. The non-volatility of this storage means that the stored data is maintained regardless of whether power is being supplied to computer 101 and/or directly to persistent storage 113. Persistent storage 113 may be a read only memory (ROM), but typically at least a portion of the persistent storage allows writing of data, deletion of data and re-writing of data. Some familiar forms of persistent storage include magnetic disks and solid state storage devices. Operating system 122 may take several forms, such as various known proprietary operating systems or open source Portable Operating System Interface-type operating systems that employ a kernel. The code included in block 150 typically includes at least some of the computer code involved in performing the inventive methods.

PERIPHERAL DEVICE SET 114 includes the set of peripheral devices of computer 101. Data communication connections between the peripheral devices and the other components of computer 101 may be implemented in various ways, such as Bluetooth connections, Near-Field Communication (NFC) connections, connections made by cables (such as universal serial bus (USB) type cables), insertion-type connections (for example, secure digital (SD) card), connections made through local area communication networks and even connections made through wide area networks such as the internet. In various embodiments, UI device set 123 may include components such as a display screen, speaker, microphone, wearable devices (such as goggles and smart watches), keyboard, mouse, printer, touchpad, game controllers, and haptic devices. Storage 124 is external storage, such as an external hard drive, or insertable storage, such as an SD card. Storage 124 may be persistent and/or volatile. In some embodiments, storage 124 may take the form of a quantum computing storage device for storing data in the form of qubits. In embodiments where computer 101 is required to have a large amount of storage (for example, where computer 101 locally stores and manages a large database) then this storage may be provided by peripheral storage devices designed for storing very large amounts of data, such as a storage area network (SAN) that is shared by multiple, geographically distributed computers. IoT sensor set 125 is made up of sensors that can be used in Internet of Things applications. For example, one sensor may be a thermometer and another sensor may be a motion detector.

NETWORK MODULE 115 is the collection of computer software, hardware, and firmware that allows computer 101 to communicate with other computers through WAN 102. Network module 115 may include hardware, such as modems or Wi-Fi signal transceivers, software for packetizing and/or de-packetizing data for communication network transmission, and/or web browser software for communicating data over the internet. In some embodiments, network control functions and network forwarding functions of network module 115 are performed on the same physical hardware device. In other embodiments (for example, embodiments that utilize software-defined networking (SDN)), the control functions and the forwarding functions of network module 115 are performed on physically separate devices, such that the control functions manage several different network hardware devices. Computer readable program instructions for performing the inventive methods can typically be downloaded to computer 101 from an external computer or external storage device through a network adapter card or network interface included in network module 115.

WAN 102 is any wide area network (for example, the internet) capable of communicating computer data over non-local distances by any technology for communicating computer data, now known or to be developed in the future. In some embodiments, the WAN 102 may be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers and edge servers.

END USER DEVICE (EUD) 103 is any computer system that is used and controlled by an end user (for example, a customer of an enterprise that operates computer 101), and may take any of the forms discussed above in connection with computer 101. EUD 103 typically receives helpful and useful data from the operations of computer 101. For example, in a hypothetical case where computer 101 is designed to provide a recommendation to an end user, this recommendation would typically be communicated from network module 115 of computer 101 through WAN 102 to EUD 103. In this way, EUD 103 can display, or otherwise present, the recommendation to an end user. In some embodiments, EUD 103 may be a client device, such as thin client, heavy client, mainframe computer, desktop computer and so on.

REMOTE SERVER 104 is any computer system that serves at least some data and/or functionality to computer 101. Remote server 104 may be controlled and used by the same entity that operates computer 101. Remote server 104 represents the machine(s) that collect and store helpful and useful data for use by other computers, such as computer 101. For example, in a hypothetical case where computer 101 is designed and programmed to provide a recommendation based on historical data, then this historical data may be provided to computer 101 from remote database 130 of remote server 104.

PUBLIC CLOUD 105 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economies of scale. The direct and active management of the computing resources of public cloud 105 is performed by the computer hardware and/or software of cloud orchestration module 141. The computing resources provided by public cloud 105 are typically implemented by virtual computing environments that run on various computers making up the computers of host physical machine set 142, which is the universe of physical computers in and/or available to public cloud 105. The virtual computing environments (VCEs) typically take the form of virtual machines from virtual machine set 143 and/or containers from container set 144. It is understood that these VCEs may be stored as images and may be transferred among and between the various physical machine hosts, either as images or after instantiation of the VCE. Cloud orchestration module 141 manages the transfer and storage of images, deploys new instantiations of VCEs and manages active instantiations of VCE deployments. Gateway 140 is the collection of computer software, hardware, and firmware that allows public cloud 105 to communicate through WAN 102.

Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

PRIVATE CLOUD 106 is similar to public cloud 105, except that the computing resources are only available for use by a single enterprise. While private cloud 106 is depicted as being in communication with WAN 102, in other embodiments a private cloud may be disconnected from the internet entirely and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 105 and private cloud 106 are both part of a larger hybrid cloud.

CLOUD COMPUTING SERVICES AND/OR MICRO-SERVICES (not separately shown in FIG. 1): private and public clouds 106 are programmed and configured to deliver cloud computing services and/or microservices (unless otherwise indicated, the word "microservices" shall be interpreted as inclusive of larger "services" regardless of size). Cloud services are infrastructure, platforms, or software that are typically hosted by third-party providers and made available to users through the internet. Cloud services facilitate the flow of user data from front-end clients (for example, user-side servers, tablets, desktops, laptops), through the internet, to the provider's systems, and back. In some embodiments, cloud services may be configured and orchestrated according to as "as a service" technology paradigm where something is being presented to an internal or external customer in the form of a cloud computing service. As-a-Service offerings typically provide endpoints with which various customers interface. These endpoints are typically based on a set of APIs. One category of as-a-service offering is Platform as a Service (PaaS), where a service provider provisions, instantiates, runs, and manages a modular bundle of code that customers can use to instantiate a computing platform and one or more applications, without the complexity of building and maintaining the infrastructure typically associated with these things. Another category is Software as a Service (SaaS) where software is centrally hosted and allocated on a subscription basis. SaaS is also known as on-demand software, web-based software, or web-hosted software. Four technological sub-fields involved in cloud services are: deployment, integration, on demand, and virtual private networks.

In some aspects, a system according to various embodiments may include a processor and logic integrated with and/or executable by the processor, the logic being configured to perform one or more of the process steps recited herein. The processor may be of any configuration as described herein, such as a discrete processor or a processing circuit that includes many components such as processing hardware, memory, I/O interfaces, etc. By integrated with, what is meant is that the processor has logic embedded therewith as hardware logic, such as an application specific integrated circuit (ASIC), a FPGA, etc. By executable by the processor, what is meant is that the logic is hardware logic; software logic such as firmware, part of an operating system, part of an application program; etc., or some combination of hardware and software logic that is accessible by the processor and configured to cause the processor to perform some functionality upon execution by the processor. Software logic may be stored on local and/or remote memory of any memory type, as known in the art. Any processor known in the art may be used, such as a software processor module and/or a hardware processor such as an ASIC, a FPGA, a central processing unit (CPU), an integrated circuit (IC), a graphics processing unit (GPU), etc.

Of course, this logic may be implemented as a method on any device and/or system or as a computer program product, according to various embodiments.

Figure 2:
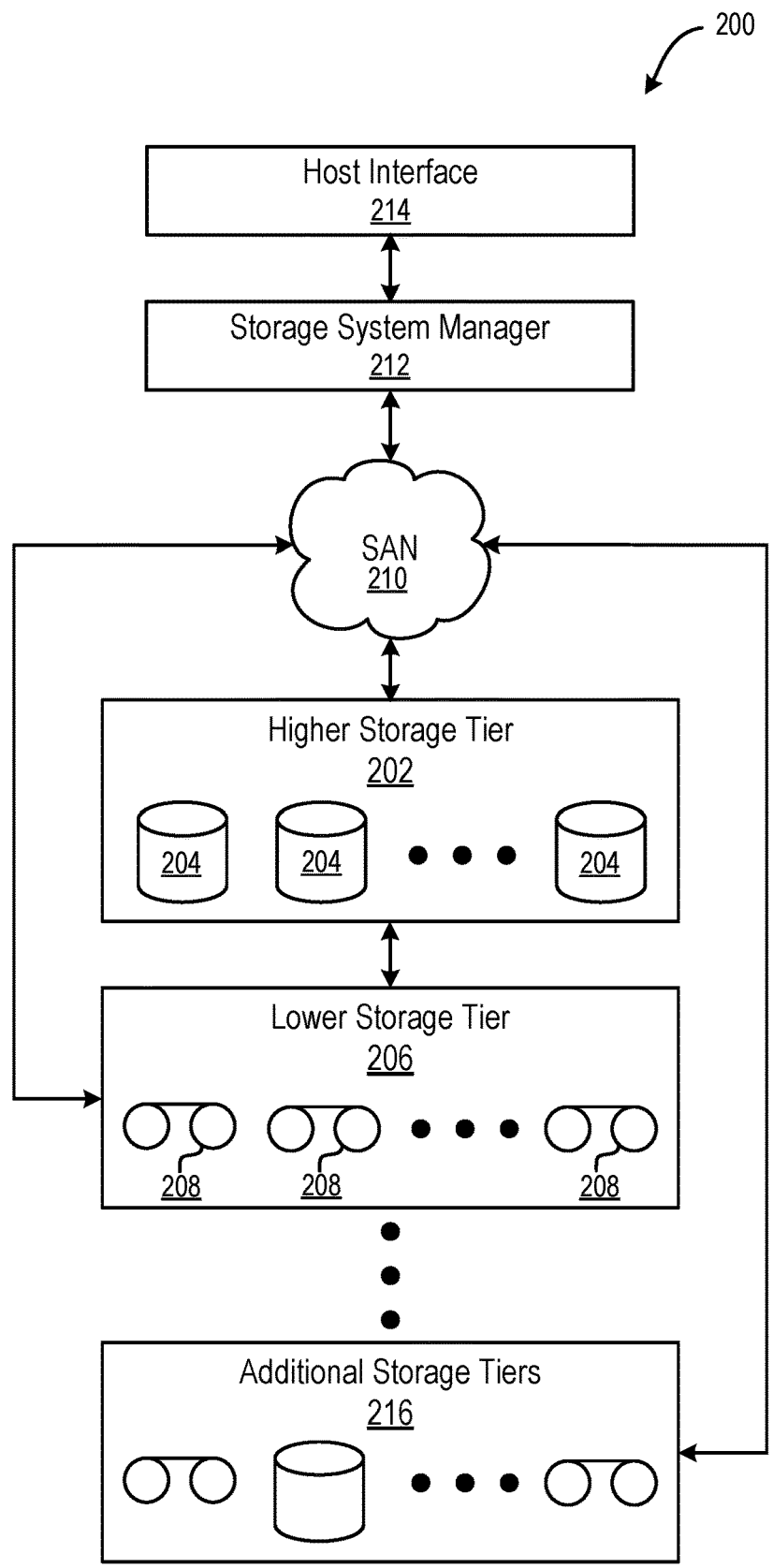
FIG. 2 is a diagram of a tiered data storage system, in accordance with one embodiment of the present invention.

Now referring to FIG. 2, a storage system 200 is shown according to one embodiment. Note that some of the elements shown in FIG. 2 may be implemented as hardware and/or software, according to various embodiments. The storage system 200 may include a storage system manager 212 for communicating with a plurality of media and/or drives on at least one higher storage tier 202 and at least one lower storage tier 206. The higher storage tier(s) 202 preferably may include one or more random access and/or direct access media 204, such as hard disks in hard disk drives (HDDs), nonvolatile memory (NVM), solid state memory in solid state drives (SSDs), flash memory, SSD arrays, flash memory arrays, etc., and/or others noted herein or known in the art. The lower storage tier(s) 206 may preferably include one or more lower performing storage media 208, including sequential access media such as magnetic tape in tape drives and/or optical media, slower accessing HDDs, slower accessing SSDs, etc., and/or others noted herein or known in the art. One or more additional storage tiers 216 may include any combination of storage memory media as desired by a designer of the system 200. Also, any of the higher storage tiers 202 and/or the lower storage tiers 206 may include some combination of storage devices and/or storage media.

The storage system manager 212 may communicate with the drives and/or storage media 204, 208 on the higher storage tier(s) 202 and lower storage tier(s) 206 through a network 210, such as a SAN, as shown in FIG. 2, Internet Protocol (IP) network, or some other suitable network type. The storage system manager 212 may also communicate with one or more host systems (not shown) through a host interface 214, which may or may not be a part of the storage system manager 212. The storage system manager 212 and/or any other component of the storage system 200 may be implemented in hardware and/or software, and may make use of a processor (not shown) for executing commands of a type known in the art, such as a central processing unit (CPU), a field programmable gate array (FPGA), an application specific integrated circuit (ASIC), etc. Of course, any arrangement of a storage system may be used, as will be apparent to those of skill in the art upon reading the present description.

In more embodiments, the storage system 200 may include any number of data storage tiers, and may include the same or different storage memory media within each storage tier. For example, each data storage tier may include the same type of storage memory media, such as HDDs, SSDs, sequential access media (tape in tape drives, optical disc in optical disc drives, etc.), direct access media (CD-ROM, DVD-ROM, etc.), or any combination of media storage types. In one such configuration, a higher storage tier 202, may include a majority of SSD storage media for storing data in a higher performing storage environment, and remaining storage tiers, including lower storage tier 206 and additional storage tiers 216 may include any combination of SSDs, HDDs, tape drives, etc., for storing data in a lower performing storage environment. In this way, more frequently accessed data, data having a higher priority, data needing to be accessed more quickly, etc., may be stored to the higher storage tier 202, while data not having one of these attributes may be stored to the additional storage tiers 216, including lower storage tier 206. Of course, one of skill in the art, upon reading the present descriptions, may devise many other combinations of storage media types to implement into different storage schemes, according to the embodiments presented herein.

According to some embodiments, the storage system (such as 200) may include logic configured to receive a request to open a data set, logic configured to determine if the requested data set is stored to a lower storage tier 206 of a tiered data storage system 200 in multiple associated portions, logic configured to move each associated portion of the requested data set to a higher storage tier 202 of the tiered data storage system 200, and logic configured to assemble the requested data set on the higher storage tier 202 of the tiered data storage system 200 from the associated portions.

As mentioned elsewhere above, advanced file systems provide a means to automate file management using policies and rules. Properly managing files allows efficient use and balance of premium and inexpensive storage resources by applying a policy rule. Relatively high-performance clustered file system software sometimes include a parallel file system that supports policies to govern user data movement and placement. In some use cases, file system software may support file placement policies, and file management policies during the lifecycle of a file.

Currently, policy rules within file systems are static. More specifically, in many cases, once a policy rule is installed, a policy engine will apply the rule when certain events occur. Those events are pre-defined in the policy rule and cannot be adjusted programmatically to changing circumstances. Furthermore, based on their static nature, policies are not adaptable to user actions. File systems plays a critical role in enabling access to data, as well as protecting data, and therefore the static nature of the policies described above ultimately introduce latency into file systems that experience dynamically changing actions and events.

In sharp contrast to the deficiencies of the conventional static-based techniques described above, the techniques of embodiments and approaches described herein are deployable into a file system in order to dynamically identify events that are based on various sequences of operations that are performed with respect to data of the file system. Based on this identification, appropriate policies may be dynamically determined and applied in order to overcome the shortcomings and latency experienced in the conventional techniques described elsewhere above.

More specifically, the techniques of embodiments and approaches described herein include a methodology to define a relatively intelligent engine with a file system that is based on Machine Learning (ML) techniques. The engine co-relates various activities within the file system, which may range from file creation, deletion, information collection (stat), data operations such as read and write, etc. Transformation, adaptation and intelligence take place in all fields, and machine/deep learning techniques are incorporated into many services to enhance a user experience and system efficiency at a lower cost.

File system administrators install file system policies to automate daemon responses to given actions and events. These policies are static and are preferably known to a system administrator the time they are installing the policy, however, the policies are not adaptive to user behavior. Using the techniques described herein, an adaptive policy engine that is configured to study user behavior, e.g., file access patterns, is caused to trigger actions based on changing factors in order to enhance user experience and reduce latencies that would otherwise be introduced in the event that system administrators were to manually adjust policies. More specifically, the techniques described herein use a ML and/or AI-based prediction engine embedded in a core file system implementation. A model is then trained based on historical data pertaining to users and their nature of activities on the file systems, e.g., such as file creation, deletion, information collection (stat), data operations such as read and write, etc. Read and/or write operations details may be monitored, e.g., such as amount of data written or read, access pattern (sequential, random), etc., by the engine, as well as operations such as creation, deletion, information access timestamps, frequency of access/updates, filename search patterns, etc. Based on this monitoring, predictions of the engine may be used to help identify instances of security threats, data prefetch, metadata optimization, backup/restore/migration, movement to and/or from storage, etc., which may be incorporated into an efficient and adaptive file placement policy.

Figure 3:
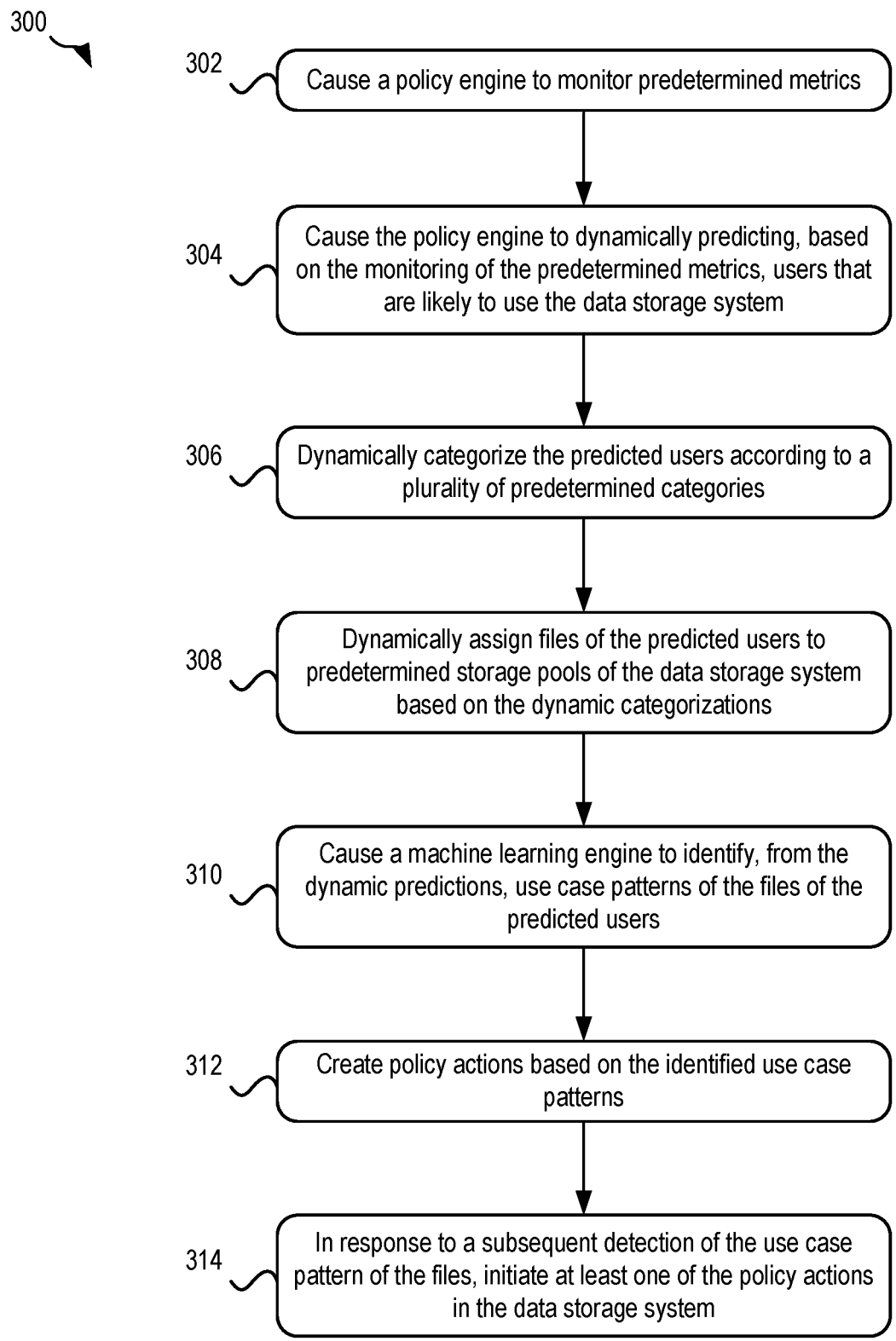
FIG. 3 is a flowchart of a method, in accordance with one embodiment of the present invention.

Now referring to FIG. 3, a flowchart of a method 300 is shown according to one embodiment. The method 300 may be performed in accordance with the present invention in any of the environments depicted in FIGS. 1-7, among others, in various embodiments. Of course, more or fewer operations than those specifically described in FIG. 3 may be included in method 300, as would be understood by one of skill in the art upon reading the present descriptions.

Each of the steps of the method 300 may be performed by any suitable component of the operating environment. For example, in various embodiments, the method 300 may be partially or entirely performed by a processing circuit, or some other device having one or more processors therein. The processor, e.g., processing circuit(s), chip(s), and/or module(s) implemented in hardware and/or software, and preferably having at least one hardware component, may be utilized in any device to perform one or more steps of the method 300. Illustrative processors include, but are not limited to, a central processing unit (CPU), an application specific integrated circuit (ASIC), a field programmable gate array (FPGA), etc., combinations thereof, or any other suitable computing device known in the art.

It may be prefaced that method 300 is preferably performed in a data storage environment that includes at least two data storage tiers, e.g., see FIG. 2. Furthermore, method 300 includes techniques for using an adaptive file placement policy engine that monitors user behavior and drive policy actions based on multiple factors. In some approaches, the policy engine is a machine learning model of a type that would become apparent to one of ordinary skill in the art after reading the descriptions herein. In one or more of such approaches, the machine learning model may be configured to intake predetermined types of data that is provided to the model and/or obtained by the model, be caused, e.g., instructed, to analyze the data, and output a result, e.g., a determination which may be a prediction.

Operation 302 includes causing a policy engine to monitor predetermined metrics. In some approaches, the predetermined metrics are monitored by the policy engine in real time at a source of the metrics, while in some other approaches, the metrics are obtained and thereafter provided to the policy engine.

The metrics are preferably based on events, e.g., application events, that occur in the data storage environment. For example, in some preferred approaches, the metrics include historical use of one or more storage pools of a data storage system, e.g., a first storage pool, a second storage pool, a third storage pool, etc. Note that each of the different storage poles have relatively different performance than one another, e.g., the first storage pool has relatively faster performance than the second storage pool, the second storage pool has relatively faster performance than the third storage pool, etc., which may be based on the type of storage drives included in the given storage pool. Furthermore, it may be noted that a "storage pool" may be another term for storage tier and/or predefined collection of data storage drives.

The metrics may, in some approaches, additionally and/or alternatively include user specific utilization of one or more of the storage pools. For example, in one or more of such approaches, the metric may be based on user specific utilization of the first storage pool. Furthermore, the metrics are, in some approaches, monitored with respect to a plurality of users and/or associated user devices that utilize files within the data storage system. For example, the monitoring of metrics in one or more of such approaches, may include monitoring a relative size of files read and/or written by a given user and additionally and/or alternatively which of the storage pools the files are written to and/or read from.

An overall utilization of one or more of the storage pools, e.g., such as the first storage pool, may be another metric that is monitored by the policy engine. For context, in some approaches, an overall utilization of one or more of the storage pools may be defined as the amount of freely available storage space that exists in the one or more storage pools and/or the amount of unavailable, e.g., occupied, storage space that exists in the one or more storage pools. Furthermore, in some approaches, the overall utilization of one or more of the storage pools may be monitored as a metric with respect to a user by user basis and/or user device by user device basis, while in some other approaches, the overall utilization of one or more of the storage pools may be monitored as a metric with respect to all users and/or user devices that use the storage pools.

Respective file creation rates of the users and/or user devices of the data storage system is yet another metric that may be monitored by the policy engine. These creation rates may be monitored for a plurality of the storage pools, in some approaches. In contrast, the creation rates may be monitored for a single one of the storage pools, e.g., preferably the first storage pool which is a relatively fastest performing storage pool in the data storage system. In some approaches, the file creation rates are determined by a file audit logging process of a type that would become apparent to one of ordinary skill in the art after reading the descriptions herein.

Operation 304 includes causing the policy engine to dynamically predict, based on the monitoring of the predetermined metrics, users that are likely to use the data storage system. The policy engine, in some approaches, uses regression and/or classification to dynamically predict the users that are likely to use the data storage system. Regression and/or classification of a type that would become apparent to one of ordinary skill in the art may be used to perform such predictions. In other words, these predictions may use patterns identified during the monitoring and prediction steps to determine when such users and/or user devices associated with the users are likely to next user the data storage system. These patterns may be identified by comparing timestamps, correlation use patterns between predefined user roles, etc.

In some preferred approaches, the predicted users are dynamically categorized into different predetermined categories, e.g., see operation 306. For context, these categorizations may be dynamic because they may be based on one or more factors that are subject to change at any time, and therefore the dynamic categorization of the predicted users into the different predetermined categories may include ongoingly recategorizing previous categorizations, e.g., in response to a determination that the predictions change, in response to a determination that use history of users and/or user devices change, in response to a determination that one or more storage pools of the data storage system exceed predetermined thresholds of available storage resources, in response to a determination that one or more storage pools of the data storage system fall below predetermined thresholds of available storage resources, etc.

In one or more preferred approaches, these dynamic categorizations may be performed based on predetermined categories. In some approaches, these categories are based on the metrics that the monitoring performed by the policy engine is based on, e.g., file create rate, storage pool utilization, overall file system utilization on a given time interval, etc. In one approach, a first category of user may be a category of user that does not create any files of at least a predetermined large size. The predetermined large size may depend on the use case in that different data storage systems are likely to include different size storage pools. In some preferred approaches, the predetermined large size is defined by files that are greater than a predetermined threshold size, e.g., a predetermined portion of a storage pool size. In some other approaches, the predetermined threshold size is dynamic in that it is set based on the size of files that are currently stored in the data storage system and/or one or more predetermined tiers therein, e.g., an average of a predetermined number of relatively largest files in the first storage pool define the predetermined large size. In some preferred approaches, the predetermined categories additionally and/or alternatively include a second category of user that creates at least some, but less than a predetermined number of files of at least the predetermined large size, e.g., users who create some relatively large files. A third category of user of the predetermined categories of users may include users that create at least a predetermined number of files of at least the predetermined large size, e.g., users who create many relatively large files.

Operation 308 includes dynamically assigning files of the predicted users to predetermined storage pools of the data storage system. These dynamic assignments are determined based on and performed based on a goal of increasing performance of the data storage system, while decreasing latency in the data storage system. Furthermore, in some preferred approaches, these dynamic assignments are performed based on an assumption that the predicted users and/or user devices are going to use the data storage system rather than in response to a determination that the users and/or user devices have already initiated data write operations. In other words, to ensure that in the event that a user and/or user device does use the data storage system, the write is able to be performed in a storage pool that the user is currently assigned to without incurring delay that would otherwise occur in in the event that such use was already anticipated, e.g., predicted in operation 304.

As mentioned elsewhere above, the different storage pools may include different types of memory and thereby each of the different storage pools may have different performance capabilities. In some preferred approaches, the data storage system includes at least two data storage pools, and a second storage pool of the data storage system has relatively slower performance than the first storage pool of the data storage system. In some approaches, the data storage system includes at least three data storage pools, and the second storage pool of the data storage system has relatively slower performance than the first storage pool of the data storage system, and a third storage pool of the data storage system has relatively slower performance than the first storage pool and the second storage pool. In one or more of the approaches above, the first storage pool may include SSDs and/or nonvolatile memory express (NVMe) drive(s). Furthermore, the second storage pool may include HDDs, and the third storage pool may include magnetic recording tape drives.

The dynamic assignments of files of the predicted users to predetermined storage pools of the data storage system may, in some approaches, be based on the dynamic categorizations described elsewhere above, e.g., see operation 306. Several use cases for performing such dynamic assignments are described below.

In a first dynamic use case, dynamically assigning the files of the predicted users to predetermined storage pools of the data storage system based on the dynamic categorizations, in some preferred approaches, includes assigning all files of users currently categorized to the first category of user to the first storage pool. In other words, all files of users currently categorized to the first category of user are preferably dynamically assigned to a relatively highest performing storage pool of the data storage system. Meanwhile, dynamically assigning the files of the predicted users to predetermined storage pools of the data storage system based on the dynamic categorizations may additionally and/or alternatively include assigning a first subset of files of users currently categorized to the second category of user to the first storage pool, and assigning a second subset of files of the users currently categorized to the second category of user to a second storage pool. The first subset of files are preferably less than or equal to a predetermined small size, while the second subset of files are files of at least the predetermined large size. Again, it should be noted that the second storage pool preferably has relatively slower performance than the first storage pool, and therefore these assignments may be performed to ensure that a relatively large number of relatively large files do not crowd the relatively faster performing storage pools of the data storage system. In some other approaches, dynamically assigning the files of the predicted users to predetermined storage pools of the data storage system based on the dynamic categorizations may additionally and/or alternatively include assigning all files of users currently categorized to the third category of user to the second storage pool, at least until such users are determined to be assigned to a relatively lower storage pool.

It may be noted that the first dynamic use case described above is based on a data storage system in which the files of the predicted users are dynamically assigned to two predetermined storage pools of the data storage system. A second dynamic use case will now be described which is based on a data storage system in which the files of the predicted users are dynamically assigned to three predetermined storage pools of the data storage system. In the second dynamic use case, the files of the predicted users are dynamically assigned to predetermined storage pools of the data storage system based on the dynamic categorizations. These assignments include assigning all files of users currently categorized to the first category of user to the first storage pool and assigning all files of the users currently categorized to the second category of user to a second storage pool. In such an assignment, the second storage pool has relatively slower performance than the first storage pool. These assignments further include assigning all files of the users currently categorized to the third category of user to the third storage pool, where the third storage pool has relatively slower performance than the second storage pool and the first storage pool.

In some approaches, the policy engine is optionally caused, e.g., instructed, to offload at least some computational processing load associated with performance of the dynamic predictions to a predetermined data processing unit. This way, a component that hosts the policy engine may not experience latency as a result of the policy engine otherwise computing relatively processing intensive operations, e.g., such as the dynamic predictions.

Operation 310 of method 300 includes causing a machine learning engine to identify, from the dynamic predictions, use case patterns of the files of the predicted users. The machine learning engine may be of a type that would become apparent to one of ordinary skill in the art after reading the descriptions herein. For example, the machine learning engine may be configured to analyze a plurality of previous files of the predicted users and user and/or user device uses of storage pools of the data storage system to correlate potential patterns with relatively likely outcomes that are based on these previous events. Policy actions may be created based on the identified use case patterns, e.g., see operation 312. These policy actions may enforce further control of use of the different storage pools in order to prevent use case patterns from compromising efficiencies within the data storage system and/or in order to ensure relatively increased efficiency within the data storage system.

The policy actions may include a security protocol in some approaches. For example, the machine learning engine may identify that use case patterns of files that violate security rules of a predetermined authority, e.g., the government, a company, an administrator. In response thereto, a policy action may be created that restricts user access to relatively faster performing storage pools of the data storage system in response to a determination that the use case pattern of files is identified. The policy actions may additionally and/or alternatively include a backup and/or restore file migration protocol. For example, in response to a determination that a data loss and/or data corruption event has occurred, use case patterns of files within a predetermined amount of time of the data loss and/or data corruption event may be identified by the machine learning engine, and a policy action that includes performing a backup and/or restore file migration operation may be included in a backup and/or restore file migration policy. Data and/or metadata prefetch protocols may additionally and/or alternatively be performed in another policy action that is created based on the identified use case patterns. Another policy action may include an optimization tuning protocol.

With the policy actions created, in response to a subsequent detection of the use case pattern of the files, at least one of the policy actions may be initiated in the data storage system, e.g., see operation 314.

Benefits of deploying the techniques described herein include increasing performance in the data storage system. This is because the techniques described herein add an intelligent policy engine to a file system that is based on AI and machine learning techniques. This addition relatively improves a user experience in the data storage system, relatively reduces costs associated with use of the data storage system, and relatively improves resource, e.g., disk space, utilization. Several use cases in which the techniques of method 300 may be deployed in order to relatively improve performance of a data storage system while relatively reducing latency are described below.

In a first use case, a file system may include two storage tiers. For example, the file system may include a relatively faster storage pool with SSDs and/or NVMes, and a relatively slower storage pool with HDDs. Each storage pool may hold data and metadata. Based on one or more tiering policies, users' files may be stored and/or migrated to the faster storage pool, and then data may be migrated to the slower storage pool based on static policy rules that are based on storage pool utilization threshold(s). Because these policy rules are static, latency is ultimately introduced into the functionality of the file system. For example, a first user may use a first user device to create relatively many relatively large files, which fill up the faster storage pool, and thereby cause a static policy migration rule to run frequently. However, this ultimately causes performance degradation due to policy scan/migration overhead. For example, important files that other users need to access relatively quickly from the relatively faster tier are not available on the relatively faster tier, as based on the policy, they are moved to the relatively slower tier. This issue is not identified without using the novel techniques described herein, because the first user may be operating within their quota limits. This issue may increase in severity as there may be a plurality of users operating in the same manner as the first user. However, using the techniques described herein, this issue is easily mitigated as an adaptive policy engine may be used to monitors the user behavior (e.g., file create rate) and drive policy actions based on multiple predetermined factors.

A second use case also includes a file system with a relatively faster storage pool and a relatively slower storage pool. Users may have different types of applications performing I/O operations against files, e.g., hybrid: applications that read and write data, readers: applications that write once and read many files, and writers: applications that write many times and never read. Using the techniques described herein, policy engines may be caused to adhere to a predetermined business requirement that includes having a relatively fast read rate (e.g., for AI modelling). In order to ensure such adherence, the reader's data may be caused to always be assigned to the relatively faster pool, despite of their pool utilization, and the writer's data may be caused to be assigned in the relatively slower pool because they never read. In the event that the application and/or user behavior changes over time, the policy engine may be configured to adopt and adjust the assignments, e.g., pool placement, accordingly to ensure that data of the readers is assigned to the relatively faster storage pool.

Figure 4:
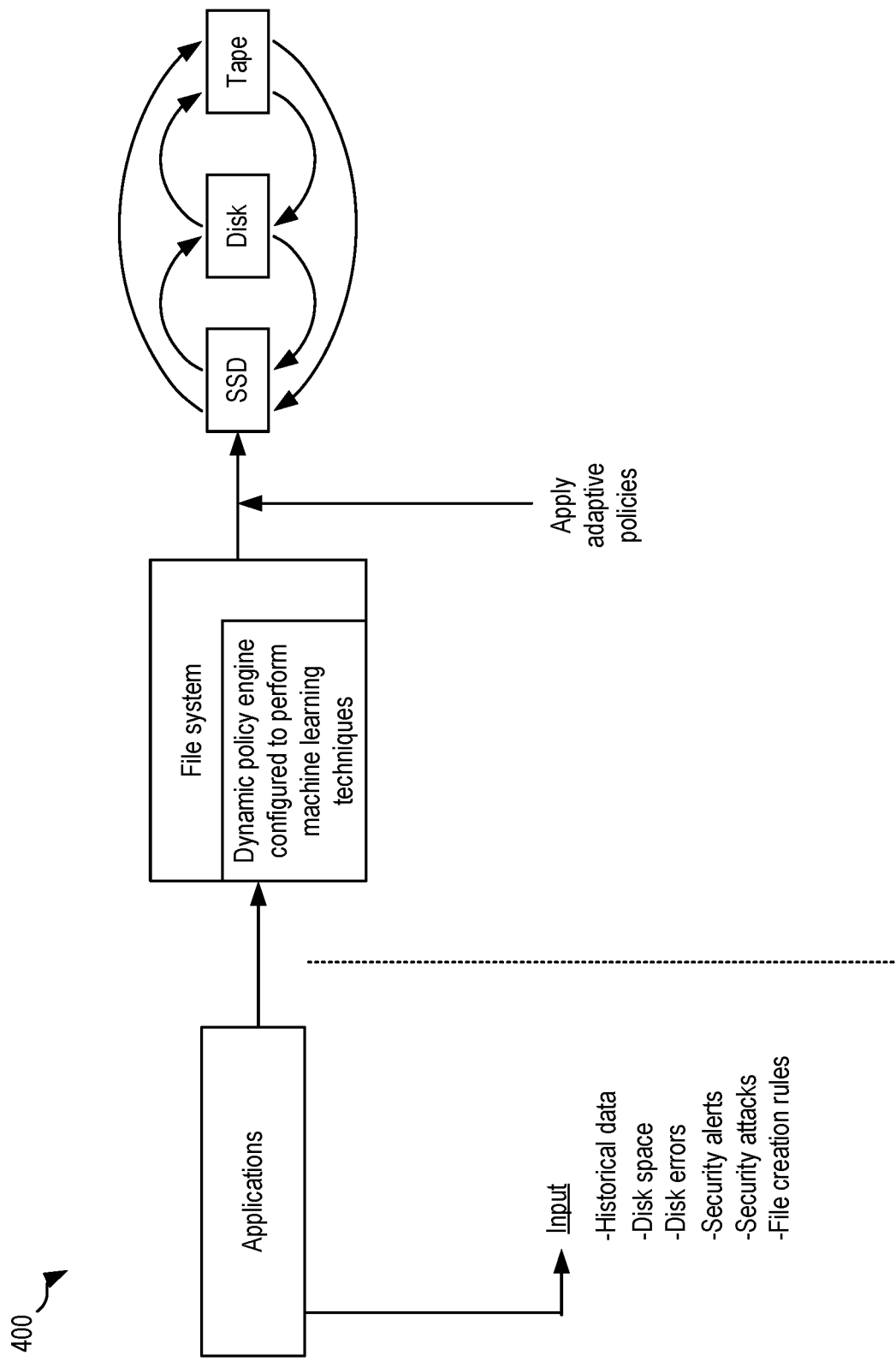
FIG. 4 depicts a system architecture, in accordance with one embodiment of the present invention.

FIG. 4 depicts a system architecture 400, in accordance with one embodiment. As an option, the present system architecture 400 may be implemented in conjunction with features from any other embodiment listed herein, such as those described with reference to the other FIGS. Of course, however, such system architecture 400 and others presented herein may be used in various applications and/or in permutations which may or may not be specifically described in the illustrative embodiments listed herein. Further, the system architecture 400 presented herein may be used in any desired environment.

The system architecture 400 includes applications having predetermined metrics that may be monitored by a dynamic policy engine of a file system. For example, as illustrated in FIG. 4, these metrics may include, e.g., historical data, disk space, disk errors, security alerts, security attacks, file creation rules, etc. The policy engine may be configured to perform machine learning techniques described herein, e.g., see method 300. The policy engine may be caused to apply adaptive policies based on dynamic predictions and/or dynamic categorizations performed by the policy engine. In some preferred approaches, application of these adaptive policies may include dynamically assigning files of the predicted users to predetermined storage pools of the data storage system, e.g., a relatively fastest performing storage pool (see SSD), a relatively second fastest performing storage pool (see Disk), and a relatively slowest performing storage pool (see Tape).

Figure 5:
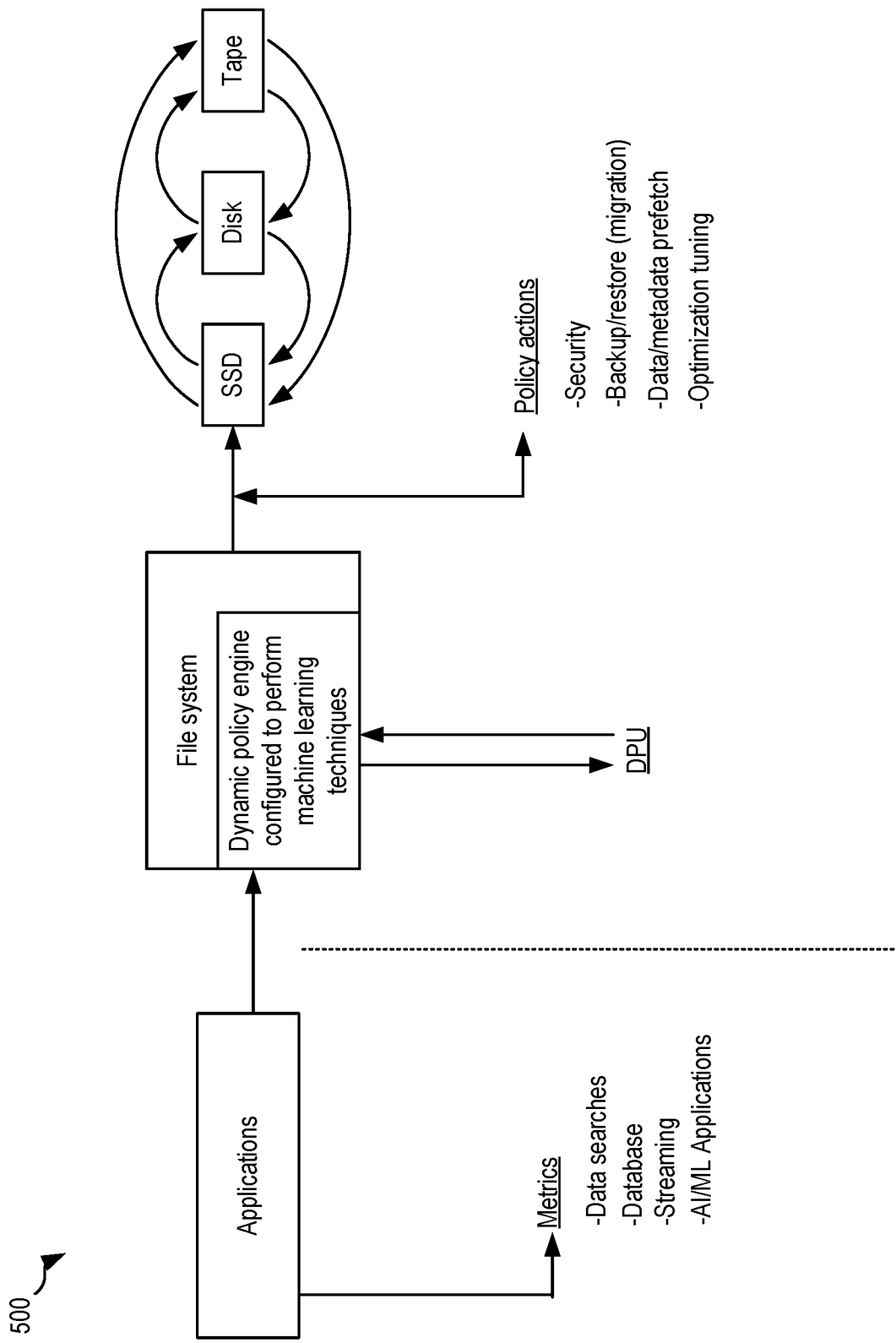
FIG. 5 depicts a system architecture, in accordance with one embodiment of the present invention.

FIG. 5 depicts a system architecture 500, in accordance with one embodiment. As an option, the present system architecture 500 may be implemented in conjunction with features from any other embodiment listed herein, such as those described with reference to the other FIGS. Of course, however, such system architecture 500 and others presented herein may be used in various applications and/or in permutations which may or may not be specifically described in the illustrative embodiments listed herein. Further, the system architecture 500 presented herein may be used in any desired environment.

The system architecture 500 includes applications having predetermined metrics that may be monitored by a dynamic policy engine of a file system. For example, as illustrated in FIG. 5, these metrics may include, e.g., data searches, databases, streaming content, AI/ML application data, etc. The policy engine may be configured to perform machine learning techniques described herein, e.g., see method 300. The policy engine may be caused to apply adaptive policies based on dynamic predictions and/or dynamic categorizations performed by the policy engine. In some preferred approaches, application of these adaptive policies may include dynamically assigning files of the predicted users to predetermined storage pools of the data storage system, e.g., a relatively fastest performing storage pool (see SSD), a relatively second fastest performing storage pool (see Disk), and a relatively slowest performing storage pool (see Tape).

In some approaches, the policy engine may optionally be caused to offload at least some computational processing load associated with performance of the dynamic predictions to a predetermined data processing unit, e.g., see DPU. Furthermore, in some approaches, the policy engine may be configured as a machine learning engine, and may be caused to identify, from the dynamic predictions, use case patterns of the files of the predicted users. The policy engine may create policy actions based on the identified use case patterns. The policy actions may range from (but are not limited to) actions such as handling security vulnerabilities, backup/restore/placement of data, prefetch of data and metadata, applying optimization tunings to the filesystem, etc., e.g., see security, backup/restore (migration), data/metadata prefetch, and optimization tuning. In response to a subsequent detection of the use case pattern of the files, at least one of the policy actions may be initiated.

Figure 6:
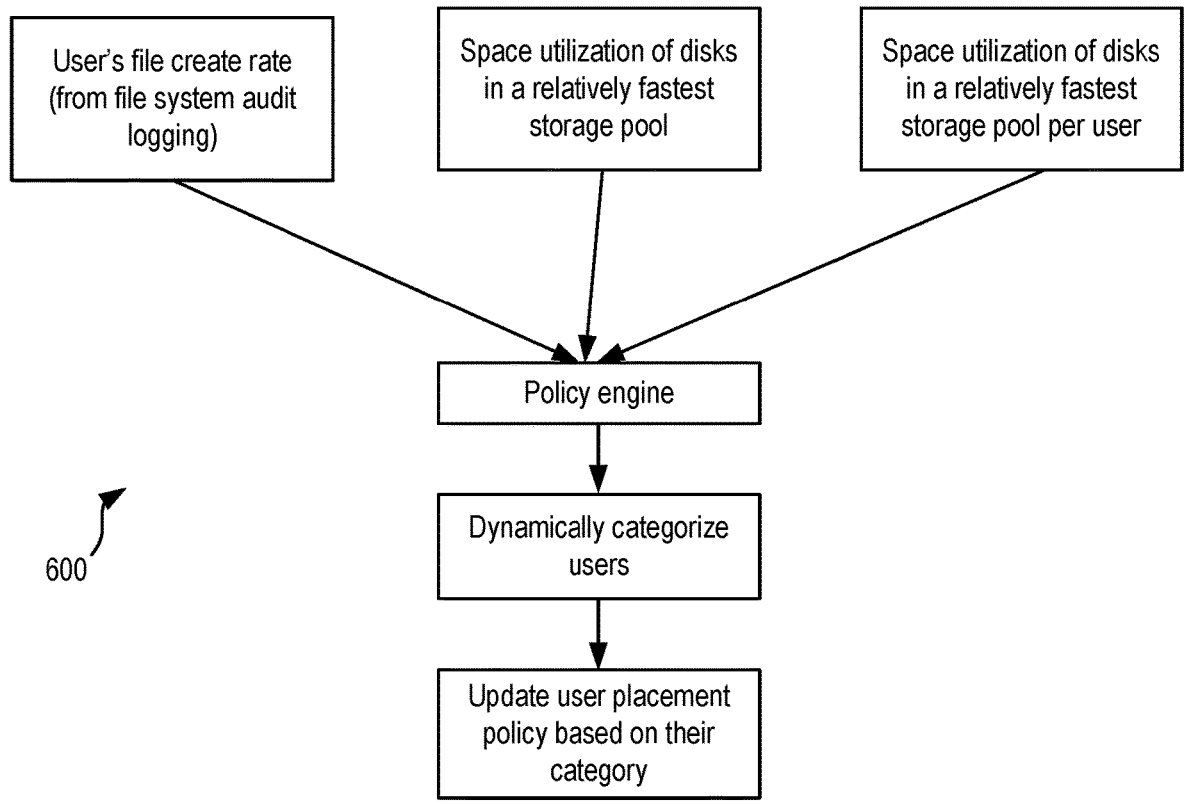
FIG. 6 is a flowchart of a method, in accordance with one embodiment of the present invention.

Now referring to FIG. 6, a flowchart of a method 600 is shown according to one embodiment. The method 600 may be performed in accordance with the present invention in any of the environments depicted in FIGS. 1-7, among others, in various embodiments. Of course, more or fewer operations than those specifically described in FIG. 6 may be included in method 600, as would be understood by one of skill in the art upon reading the present descriptions.

Each of the steps of the method 600 may be performed by any suitable component of the operating environment. For example, in various embodiments, the method 600 may be partially or entirely performed by a processing circuit, or some other device having one or more processors therein. The processor, e.g., processing circuit(s), chip(s), and/or module(s) implemented in hardware and/or software, and preferably having at least one hardware component, may be utilized in any device to perform one or more steps of the method 600. Illustrative processors include, but are not limited to, a central processing unit (CPU), an application specific integrated circuit (ASIC), a field programmable gate array (FPGA), etc., combinations thereof, or any other suitable computing device known in the art.

It may be prefaced that method 600 illustrates a relatively high level overview of operations of the techniques described elsewhere herein for dynamic assignment of files to storage pools, e.g., see method 300. For example, method 600 includes causing an adaptive policy engine, e.g., see policy engine, to monitor a plurality of predetermined metrics, e.g., create rates of user files (from file system audit logging), space utilization of disks in a relatively fastest storage pool, space utilization of disks in a relatively fastest storage pool per user, etc. Techniques described elsewhere herein, e.g., see method 300, may be relied on to cause the policy engine to dynamically categorize predicted users according to a plurality of predetermined categories, e.g., see dynamically categorize users, and dynamically assigning files of the predicted users to predetermined storage pools of a data storage system based on these categories, e.g., see update user placement policy based on their category. This way, what a given user is doing with the data of their files, e.g., create and computation, may be incorporated into a policy that storage within the data storage system is based on.

Figure 7:
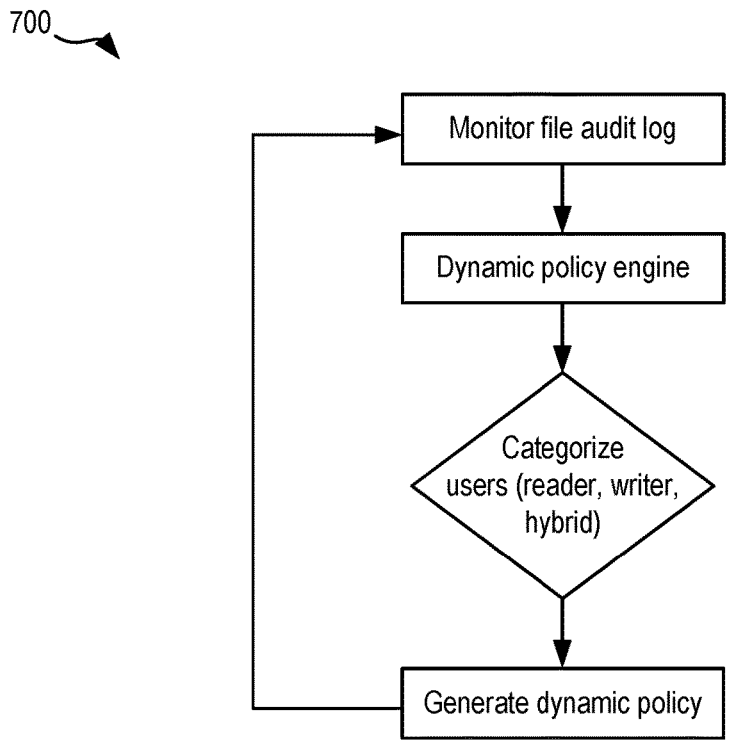
FIG. 7 is a flowchart of a method, in accordance with one embodiment of the present invention.

Now referring to FIG. 7, a flowchart of a method 700 is shown according to one embodiment. The method 700 may be performed in accordance with the present invention in any of the environments depicted in FIGS. 1-7, among others, in various embodiments. Of course, more or fewer operations than those specifically described in FIG. 7 may be included in method 700, as would be understood by one of skill in the art upon reading the present descriptions.

Each of the steps of the method 700 may be performed by any suitable component of the operating environment. For example, in various embodiments, the method 700 may be partially or entirely performed by a processing circuit, or some other device having one or more processors therein. The processor, e.g., processing circuit(s), chip(s), and/or module(s) implemented in hardware and/or software, and preferably having at least one hardware component, may be utilized in any device to perform one or more steps of the method 700. Illustrative processors include, but are not limited to, a central processing unit (CPU), an application specific integrated circuit (ASIC), a field programmable gate array (FPGA), etc., combinations thereof, or any other suitable computing device known in the art.

It may be prefaced that method 700 illustrates a relatively high level overview of operations of the techniques described elsewhere herein for dynamic assignment of files to storage pools, e.g., see method 300. More specifically, method 700 illustrates the operations of an adaptive policy engine that categorizes users dynamically based on historical I/O access patterns and generates dynamic policies continuously. The policy engine monitors user behavior, e.g., file access patterns, in some approaches, e.g., see dynamic policy engine that is fed by the monitor file audit log operation. Note that this monitoring of user behavior is only performed subsequent to gaining expressed permission from the users to do so. A policy daemon of the policy engine may be caused to monitor a file system audit log to learn users/applications behavior and rank users into a plurality of storage pools. A first of these storage pools may include readers that may be defined as users that perform read operations at least 90% of the time. A second of these storage pools may include writers that may be defined as users that perform write operations at least 90% of the time. A third of these storage pools may include hybrid users that may be defined as users that read and write data equally or randomly.

The policy engine is caused, e.g., instructed, to customize placement policies depending on these user access patterns, users in the readers categorization having their data stored on disks in a relatively fastest storage pool where users in the writer categorization have their data stored on disks in the relatively slower storage pool. Finally, the users in the hybrid categorization are assigned to have their data follow a default placement policy in which some of their data is saved in the relatively faster tier and some of their data is migrated to the relatively slower tier. In some approaches, input received from a device associated with an administrator may be used to define a threshold that governs the categorization of applications.

It will be clear that the various features of the foregoing systems and/or methodologies may be combined in any way, creating a plurality of combinations from the descriptions presented above.

It will be further appreciated that embodiments of the present invention may be provided in the form of a service deployed on behalf of a customer to offer service on demand.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method (CIM) for mitigating latency associated with static policy rules in a file system used in a data storage system, the CIM comprising:

training an artificial intelligence (AI)-based policy engine, wherein the AI-based policy engine is trained using a collection of historical data pertaining to activities on the file system;

causing the trained AI-based policy engine to monitor predetermined metrics, the predetermined metrics including use of a first storage pool of the data storage system, wherein the first storage pool has relatively faster performance than a second storage pool of the data storage system;
  causing the trained AI-based policy engine to dynamically predict, based on the monitoring of the predetermined metrics, users that are likely to use the data storage system;
  dynamically categorizing the predicted users according to a plurality of predetermined categories including: a first category of user that does not create any files of at least a predetermined large size, a second category of user that creates at least some but less than a predetermined number of files of at least the predetermined large size, and a third category of user that creates at least the predetermined number of files of at least the predetermined large size; and
  dynamically assigning files of the predicted users to predetermined storage pools of the data storage system, including the first storage pool, based on the dynamic categorizations.

2. The CIM of claim 1, wherein dynamically assigning the files of the predicted users to predetermined storage pools of the data storage system based on the dynamic categorizations includes: assigning all files of users currently categorized to the first category of user to the first storage pool.

3. The CIM of claim 2, wherein dynamically assigning the files of the predicted users to predetermined storage pools of the data storage system based on the dynamic categorizations includes: assigning a first subset of files of users currently categorized to the second category of user to the first storage pool, wherein the first subset of files are less than a predetermined small size; and assigning a second subset of files of the users currently categorized to the second category of user to the second storage pool, wherein the second subset of files are files of at least the predetermined large size.

4. The CIM of claim 3, wherein dynamically assigning the files of the predicted users to predetermined storage pools of the data storage system based on the dynamic categorizations includes: assigning all files of users currently categorized to the third category of user to the second storage pool.

5. The CIM of claim 3, wherein the predetermined metrics include: user specific utilization of the first storage pool for a plurality of users, an overall utilization of the first storage pool, and respective file creation rates of the users, wherein the file creation rates are determined by a file audit logging process.

6. The CIM of claim 1, wherein dynamically assigning the files of the predicted users to predetermined storage pools of the data storage system based on the dynamic categorizations includes: assigning all files of users currently categorized to the first category of user to the first storage pool; assigning all files of the users currently categorized to the second category of user to the second storage pool; and assigning all files of the users currently categorized to the third category of user to a third storage pool, wherein the third storage pool has relatively slower performance than the second storage pool.

7. The CIM of claim 6, wherein the first storage pool includes solid state drive(s) (SSDs) and/or nonvolatile memory express (NVMe) drive(s), wherein the second storage pool includes hard disk drive(s) (HDDs), wherein the third storage pool includes magnetic recording tape drives.

8. The CIM of claim 1, wherein the trained AI-based policy engine uses regression and/or classification to dynamically predict the users that are likely to use the data storage system.

9. The CIM of claim 1, comprising: performing a latency mitigating offload operation for increasing performance of the data storage system by reducing an extent of latency experienced by a component of the file system that hosts the trained AI-based policy engine, wherein the performing the latency mitigating offload operation comprises causing the trained AI-based policy engine to offload at least some computational processing load associated with performance of the dynamic predictions to a predetermined data processing unit; causing a machine learning engine to identify, from the dynamic predictions, use case patterns of the files of the predicted users; creating policy actions based on the identified use case patterns, wherein the policy actions include a an optimization tuning protocol; and in response to a subsequent detection of the use case pattern of the files, initiating the optimization tuning protocol in the data storage system.

10. A computer program product (CPP) for mitigating latency associated with static policy rules in a file system used in a data storage system, the CPP comprising:
  a set of one or more computer-readable storage media; and
  program instructions, collectively stored in the set of one or more storage media, for causing a processor set to perform the following computer operations:
  train an artificial intelligence (AI)-based policy engine, wherein the AI-based policy engine is trained using a collection of historical data pertaining to activities on the file system;
  cause the trained AI-based policy engine to monitor predetermined metrics, the predetermined metrics including use of a first storage pool of the data storage system, wherein the first storage pool has relatively faster performance than a second storage pool of the data storage system;
  cause the trained AI-based policy engine to dynamically predict, based on the monitoring of the predetermined metrics, users that are likely to use the data storage system;
  dynamically categorize the predicted users according to a plurality of predetermined categories including: a first category of user that does not create any files of at least a predetermined large size, a second category of user that creates at least some but less than a predetermined number of files of at least the predetermined large size, and a third category of user that creates at least the predetermined number of files of at least the predetermined large size; and
  dynamically assign files of the predicted users to predetermined storage pools of the data storage system, including the first storage pool, based on the dynamic categorizations.

11. The CPP of claim 10, wherein dynamically assigning the files of the predicted users to predetermined storage pools of the data storage system based on the dynamic categorizations includes: assigning all files of users currently categorized to the first category of user to the first storage pool.

12. The CPP of claim 11, wherein dynamically assigning the files of the predicted users to predetermined storage pools of the data storage system based on the dynamic categorizations includes: assigning a first subset of files of users currently categorized to the second category of user to the first storage pool, wherein the first subset of files are less than a predetermined small size; and assigning a second subset of files of the users currently categorized to the second category of user to the second storage pool, wherein the second subset of files are files of at least the predetermined large size.

13. The CPP of claim 12, wherein dynamically assigning the files of the predicted users to predetermined storage pools of the data storage system based on the dynamic categorizations includes: assigning all files of users currently categorized to the third category of user to the second storage pool.

14. The CPP of claim 12, wherein the predetermined metrics include: user specific utilization of the first storage pool for a plurality of users, an overall utilization of the first storage pool, and respective file creation rates of the users, wherein the file creation rates are determined by a file audit logging process.

15. The CPP of claim 10, wherein dynamically assigning the files of the predicted users to predetermined storage pools of the data storage system based on the dynamic categorizations includes: assigning all files of users currently categorized to the first category of user to the first storage pool; assigning all files of the users currently categorized to the second category of user to the second storage pool; and assigning all files of the users currently categorized to the third category of user to a third storage pool, wherein the third storage pool has relatively slower performance than the second storage pool.

16. The CPP of claim 15, wherein the first storage pool includes solid state drive(s) (SSDs) and/or nonvolatile memory express (NVMe) drive(s), wherein the second storage pool includes hard disk drive(s) (HDDs), wherein the third storage pool includes magnetic recording tape drives.

17. The CPP of claim 10, wherein the trained AI-based policy engine uses regression and/or classification to dynamically predict the users that are likely to use the data storage system.

18. The CPP of claim 10, comprising: program instructions, collectively stored in the set of one or more storage media, for causing the processor set to perform the following computer operations: perform a latency mitigating offload operation for increasing performance of the data storage system by reducing an extent of latency experienced by a component of the file system that hosts the trained AI-based policy engine, wherein the performing the latency mitigating offload operation comprises cause the trained AI-based policy engine to offload at least some computational processing load associated with performance of the dynamic predictions to a predetermined data processing unit; cause a machine learning engine to identify, from the dynamic predictions, use case patterns of the files of the predicted users; create policy actions based on the identified use case patterns, wherein the policy actions include an optimization tuning protocol; and in response to a subsequent detection of the use case pattern of the files, initiate the optimization tuning protocol in the data storage system.

19. A computer system (CS) for mitigating latency associated with static policy rules in a file system used in a data storage system, the CS comprising:
 a processor set;
 a set of one or more computer-readable storage media; and
 program instructions, collectively stored in the set of one or more storage media, for causing the processor set to perform the following computer operations:
 train an artificial intelligence (AI)-based policy engine, wherein the AI-based policy engine is trained using a collection of historical data pertaining to activities on the file system;
 cause the trained AI-based policy engine to monitor predetermined metrics, the predetermined metrics including use of a first storage pool of the data storage system, wherein the first storage pool has relatively faster performance than a second storage pool of the data storage system;
 cause the trained AI-based policy engine to dynamically predict, based on the monitoring of the predetermined metrics, users that are likely to use the data storage system;
 dynamically categorize the predicted users according to a plurality of predetermined categories including: a first category of user that does not create any files of at least a predetermined large size, a second category of user that creates at least some but less than a predetermined number of files of at least the predetermined large size, and a third category of user that creates at least the predetermined number of files of at least the predetermined large size; and
 dynamically assign files of the predicted users to predetermined storage pools of the data storage system, including the first storage pool, based on the dynamic categorizations.

20. The CS of claim 19, wherein dynamically assigning the files of the predicted users to predetermined storage pools of the data storage system based on the dynamic categorizations includes: assigning all files of users currently categorized to the first category of user to the first storage pool.

* * * * *